Patented Oct. 15, 1946

2,409,332

UNITED STATES PATENT OFFICE 2,409,332

RESINOUS COMPOSITION AND METHOD FOR PRODUCING THE SAME

Howard C. Woodruff, Philadelphia, Pa.

No Drawing. Application May 29, 1942,
Serial No. 444,999½

3 Claims. (Cl. 260—104)

The coating and resinous compositions of my present invention are highly complex materials having improved compatibility, improved hardness, and improved stability and the technical operations in which they are employed are greatly simplified.

It is an object of my invention to produce complex varnish resins which are readily soluble in highly polymerized drying oils. It is also an object of my invention to produce oil compositions which easily dissolve highly polymeric resins. It is further an object of my invention to process difficultly-oil-soluble varnish resins, to render them easily soluble without interfering with their otherwise technically desirable characteristics.

It is further an object of my invention to produce new compositions of matter useful as varnish resins, lacquer resins, and as a basis for new coating compositions.

Highly complex varnish resins can be dissolved in highly polymerized varnish oils only at excessively high temperatures or by the dispersion method of cooking that is difficult to handle and not always capable of producing uniformly successful results. Suggestions for the use of solubilizing agents cooked with the resin-oil mixture have been made but these produce other difficulties such as slower drying, decreased water resistance and the like.

This difficulty is likewise observed in the resin ingredient of lacquer compositions, incompatibility largely limits the use of certain types of resins and oils. Moreover, certain resin compositions cannot be formed due to the incompatibility of the ingredients increasing as the individual element-complexity increases.

This invention has as an object the decreasing of a large measure of these difficulties.

These objects are accomplished by treating polyglyceride esters, or other condensed polyhydric or polymerized polyhydric alcohol esters with polyhydric alcohols and the subsequent production of diethers and the use of these ether-bearing materials with other chemicals to produce the properties desired.

For purposes of discussion polyglyceride esters are here discussed but this is not to be construed as a limitation, since the esters of other condensed or polymerized polyhydric alcohols undergo the same or similar or analogous reactions.

Polyglyceride esters are compounds conforming to the general formula

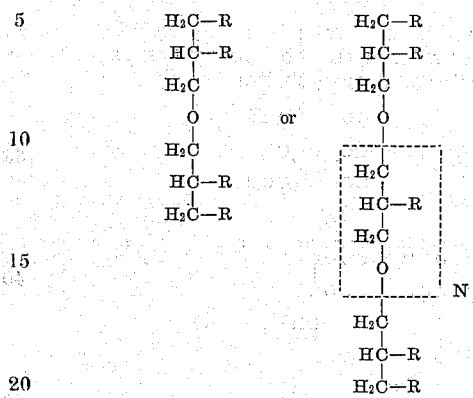

in which R represents any acid group. Usually however R represents a complex organic acid, a fatty oil acid, a resinous acid, or a complex resinous acid, or a modified fatty oil acid. In the formula N represents any small whole number of the groups within the ruling.

Polyglyceride esters may be prepared by the following methods:

By direct esterification of polyglycerol as outlined by E. M. Symmes, U. S. Patent No. 1,696,337.

By elimination of water between two mols of diglyceride esters as described by T. F. Bradley, Industrial and Engineering Chemistry 28, 5, 579 (1937).

By reacting acids with glycerine in excess of that required to form triglycerides as described by H. C. Woodruff, Paint and Varnish Production Manager, November 1940.

Polyglyceride esters are a constituent of practically every ester resin based on glycerine.

I have found that polyhydric alcohols such as simple glycols, polyglycols, glycerine, mannitol, sorbitol, pentaerythritol, erythritol, dipentaerythritol, enneaheptatite, glycerol di and trilactides, inositol lactides, methyl glucoside lactides react with polyglyceride esters which, except in the instance of dihydric alcohols which have their own special use in the scope of this invention, react with polyglyceride esters to form new ether-containing compounds or compositions which contain hydroxyl groups and react and conduct themselves as active hydroxyl containing compounds. Such compounds or compositions may then further react with a fatty oil acid, a modified fatty oil acid, a resinous acid, a modified resinous acid a complex organic acid, or a dibasic acid such as phthalic, succinic, sebacic, fumaric, tartaric, citric, dilactylic, tricarballylic, salicylacetic, chlorophthalic, pyromellitic, naphthalic, hexa-hydronaphthalic, diphenic or quinolinic or natural resin acids such as rosin, kauri or fused congo. For example two moles of glycerine ester $$\begin{array}{cc} H & H \\ H\overset{|}{C}OOCR & RCOO\overset{|}{C}H \\ H\overset{|}{C}OOCR & RCOO\overset{|}{C}H \\ H\overset{|}{C}OOCR & RCOO\overset{|}{C}H \\ \diagdown H & H\diagup \end{array}$$

Unite to form one mole of

An ether $$\begin{array}{cc} H & H \\ H\overset{|}{C}OOCR & CROO\overset{|}{C}H \\ H\overset{|}{C}OOCR & CROO\overset{|}{C}H \\ H\overset{|}{C}\text{———O———}\overset{|}{C}H \\ H & H \end{array}$$

and

An anhydride $$\begin{array}{c} O \\ RC\diagup \\ \diagdown O \\ RC\diagup \\ \diagdown O \end{array}$$

The ether thus formed is highly reactive and its oxygen unites with two hydroxyls of a polyalcohol such as pentaerythritol $$\begin{array}{cc} HO & OH \\ H_2\overset{|}{C} & \overset{|}{C}H_2 \\ \diagdown \diagup \\ HOC\text{—}C\text{—}COH \\ \overset{|}{H_2} \quad \overset{|}{H_2} \end{array}$$

To form two ether groups and Water $$\begin{array}{c} H_2COOCR \quad RCOOCH_2 \\ H\overset{|}{C}OOCR \quad RCOO\overset{|}{C}H \\ H_2\overset{|}{C}\text{—O} \quad O\text{—}\overset{|}{C}H_2 \\ H_2\overset{|}{C} \quad \overset{|}{C}H_2 \\ \diagdown \diagup \\ C \\ \diagup \diagdown \\ OH\overset{|}{C} \quad \overset{|}{C}OH \\ H_2 \quad H_2 \end{array}$$

$H_2O$

The remaining hydroxyls react with many acids such as resin and others named above.

Throughout the process and in the final composition the pentaerythritol nucleus consisting of a central carbon atom, to which four CH₂ groups are attached, remains unchanged in its tertiary carbon characters.

The propyl group of glycerine, the

—CH₂—CH—CH₂— retains its identity throughout its reactions.

In the case of the simple glycols reacting with polyglyceride esters no further treatment is necessary to obtain the desired results. However the reaction products between polyglycerol esters and polydialcohols and/or dipolyalcohols conduct themselves exactly similar to polyglycerol esters, but with certain desirable and advantageous properties.

The reaction between an acid and a polyhydric composition produced by the action of a polyhydric alcohol on a reaction product of a polydialcohol or a dipolyalcohol and a polyglycerol ester also comes within the scope of this invention.

The reactions are conducted at temperatures usually less than 600° F. in an open or closed reaction kettle and preferably, although not necessarily under vacuum. The mass may or may not be agitated, although agitation is considerably helpful.

The following examples are for the purpose of illustration only and are not to be so construed as to limit the invention as to proportions or scope. Parts are by weight. Melting points are taken by the mercury method.

EXAMPLE 1

*A22 resin*

| | Parts |
|---|---|
| WW wood rosin | 1,000 |
| Glycerine | 135 |

Under air reflux held 550° F. until clear in toluol and an additional hour.

A. N. 2.8, Zerewitinoff hydroxyl hydrogen corrected .02%, alcohol titration 25.0, M. P. (Hg) 77° C. Ether content (acid absorption method) 55%, water extractable glycerine 0.25%.

Alcohol titration test is a measure of lacquer compatibility. 10 gr. of resin are dissolved in 10 gr. of toluol. The alcohol titration is the c. c. of alcohol required to cloud the solution.

Acid absorption method consists of heating resin with excess rosin at 530° F. until the acid number is constant. The rosin absorbed is then calculated to per cent polyglyceride ester (or ether) in the resin taken. Corrections are made for free hydroxyl groups which are previously determined by the Zerewitinoff method corrected for acid value.

| | Parts |
|---|---|
| A22 resin | 120 |
| Mannitol | 5 |

Completely dissolved at 570° F. after 5 minutes, added maleic anhydride 5 parts. Held 530° F. 5½ hrs. A. N. 14, M. P. 240° F.

Varnish prepared from this resin:

| | Parts |
|---|---|
| Resin | 100 |
| Linseed oil previously heated at 580° F. to a cold string | 200 |

Cobalt naphthenate: .05% cobalt metal on weight of oil.

Resin dissolved clear in stringed oil at 530° F. Viscosity 50%, solids in mineral spirits: D-E. Excellent drying and water resistance characteristics.

Pentaerythritol can be substituted for mannitol with equivalent results.

EXAMPLE 2

| | Parts |
|---|---|
| A22 resin | 120 |
| Mannitol | 5 |

Dissolved after 5 minutes at 570° F., added WW wood rosin 20 parts; held 540° F. 5 hrs. A. N. 9, M. P. 225° F., alcohol titration 27. Varnish as above in Example No. 1. Viscosity C. Slightly slower than Example No. 1 and water resistance slightly less.

If mannitol is substituted by pentaerythritol, equivalent results are produced.

EXAMPLE 3

| | Parts |
|---|---|
| Resin A22 | 500 |
| Di-ethylene glycol | 25 |

Refluxed at 540° F. 6 hrs. Zerewitinoff hydroxyl hydrogen content 0.01%, ether content (acid absorption method) 69%, A. N. 3.2, alcohol titration 34.2, M. P. 60° C.

Added glycerine 40 parts, refluxed at 540° F. 3½ hrs. Water extractable glycerine 0.4%; added maleic anhydride 27 parts; held 520–530° F. 3 hrs. A. N. 7.3, M. P. 250° F.

*Varnish*

| | Parts |
|---|---|
| Resin | 100 |
| Linseed oil heated to a cold string | 200 |

Cobalt naphthenate: 0.05% cobalt metal on weight of oil.

300 parts mineral thinner. Resin dissolved clear. Viscosity F–G. Drying and water resistance slightly better than resin of Example No. 1 in same formula.

EXAMPLE 4

| | Parts |
|---|---|
| A22 resin | 120 |
| Mannitol | 5 |

Completely dissolved at 570° F. in 30 minutes; added maleic anhydride 5 parts. Held 530° F. 5½ hrs. A. N. 16.3, alcohol titration 23.0, M. P. 227° F.

*Varnish*

Viscosity C–D.

| | Parts |
|---|---|
| Mineral thinner | 300 |
| Resin containing maleic anhydride | 100 |
| Linseed oil heated to a cold string | 200 |

Cobalt naphthenate: .05% cobalt on weight of oil. Resin dissolved clear in stringed oil at 530° F. Surface dry equals Example No. 3 but not quite so good thru dry. Very slightly less water resistance.

In this example pentaerythritol may be used interchangeably with mannitol.

*Lacquer*

| | Parts |
|---|---|
| Resin containing maleic anhydride | 100 |
| Blown castor oil | 100 |
| Nitrocellulose | 100 |
| Lacquer thinner | 300 |

A clear nonblushing lacquer was produced, of remarkable plasticity and adhesion.

EXAMPLE 5

*Resin PhA*

| | Parts |
|---|---|
| Diphenylolpropane | 100 |
| Formaldehyde, 36% aq | 220 |

Combined by reacting in aq. alkali medium at 60° C. for 48 hrs. Freed from alkali by carefully neutralizing with HCl and washing with warm $H_2O$.

Added this resin dissolved in an equal weight of alcohol to WW wood rosin 700 parts, while maintaining temperature at 400° F., a terpenic phenolic modified acid is thus produced.

| | Parts |
|---|---|
| A22 resin (ref. Example No. 1) | 1,000 |
| Mannitol | 80 |

Dissolved mannitol in 15 minutes at 570° F. added resin PhA 800 parts. Held temperature at 530° F. 4 hrs. A. N. 15.3, viscosity 50% in toluol B–C, M. P. 270° F.

| | Parts |
|---|---|
| Mineral thinner | 300 |
| Resin | 100 |
| Linseed oil heated to a cold string | 200 |

Cobalt naphthenate: .05% cobalt metal on weight of oil.

Resin dissolved clear in stringed oil at 520–525 F. Viscosity 50% mineral spirits F–G.

Drying exceptionally hard fast drying varnish. Pentaerythritol may be substituted for mannitol in this example.

EXAMPLE 6

*C37 resin*

| | Parts |
|---|---|
| 1. Soya oil | 776 |
| 2. LB dehydrated castor oil | 259 |
| 3. Glycerine | 240 |
| 4. Phthalic anhydride | 725 |
| 5. Fumaric acid | 15 |
| 6. Glycerine | 100 |

1, 2, 3 heated at 510° F. under reflux until soluble in 2 vols. of methanol; 4 and 5 added, temperature held 420–430° F. to A. N. less than 10.

*Characteristics*

A. N. solids 8.0.

*C37A*.—50% solution in mineral spirits. Color 6, viscosity Z3.

Equal parts oil and alkyd solution. Will not blend clear with linseed oil bodied to Z viscosity.

*C37B*.—Thinned to viscosity H with mineral spirits, added lead and cobalt naphthenate to equal 0.3% lead and 0.05% cobalt as metal based on the weight of the solids.

*Drying*.—Set 2 hrs. Tack free 6–7 hrs. White in cold $H_2O$ 24 hrs. Recovers in 1½ hrs.

This is a commercial standard type alkyd used for reference.

| | Parts |
|---|---|
| Resin C37 solids | 300 |
| Ethylene glycol | 10 |

Refluxed 2 hrs. at 475° F.; raised temperature to 530° F., held 2 hrs. Alkyd was then clear in toluol solution, the diglyceride ethers in the Resin C37 solids having reacted with the two hydroxyls of the glycol with the elimination of water produce a more blendable alkyd due to the ether (R—O—CH$_2$—CH$_2$—O—R) bond between the large molecular segments of the original alkyd and the more widely separated stearic condition thus produced.

*Characteristics*

A. N. solids 5.2. 50% solution in mineral thinner. Color 6, viscosity Z1–Z2. Forms clear blend with linseed oil bodied to Z viscosity, in the proportion of equal parts oil and alkyd solution. Thinned to viscosity H with mineral thinner, added lead and cobalt as in C37B.

*Drying*.—Set 2 hrs. Tack free 6–7 hrs. White in cold $H_2O$ in 24 hrs. Recovers in 1½ hrs.

Ethylene glycol dilactide can be substituted for ethylene glycol in this example with equivalent results.

Repeat of above but di-ethylene glycol substituted for ethylene glycol:

*Characteristics*

A. N. solids 5.2. 50% solution in mineral thinner. Color 6, viscosity Z1–Z2. Clear blend with equal part by weight Z linseed oil.

Thinner and drier same as C37B.

*Drying*.—Set 2 hrs. Tack free 6–7 hrs. White in cold $H_2O$ after 24 hrs. Recovers after 1½ hrs.

This alkyd has exceptional blending characteristics with urea formaldehyde resin solutions, and with a wide variety of oleoresinous varnishes.

Example 7

| | Parts |
|---|---|
| Resin solids from Example No. 6 | 1,000 |
| Glycerine | 30 |

Heated at 560° F. under reflux for 3 hrs., solution in toluol was then clear. Added phthalic anhydride 20 parts. Held 540° F. 2 hrs.

Characteristics

A. N. solids 7.0. 50% solution in mineral spirits. Color 6. Viscosity Z5–Z6. Blends clear with an equal weight of Z linseed oil. Thinner and driers same as C37B.

*Drying.*—Set 2 hrs. Tack free 5–5½ hrs. Very slightly white in cold H2O after 24 hrs. Recovers in less than 1 hr.

In spite of the greatly increased viscosity this resin retains the same blendability as the resin in Example 6. An equivalent weight of trimethylol propane can be substituted for glycerine.

Example 8

| | Parts |
|---|---|
| Varnish maker's alkali refined linseed oil | 1,000 |
| Glycerine | 60 |

Reflux at 540° F. 4 hrs. Raise temperature to 580° F., hold 5 hrs. Apply vacuum at 580° F. for 1½ hrs. Zerewitinoff hydroxyl hydrogen 0.04%, ether content by acid absorption method 31%. Water extractable glycerine, none detectable. Add ethylene glycol 40 parts. Refluxed 450° F. 3 hrs. Raised to 540° F., held 2 hrs. Viscosity Y–Z.

Extractable ethylene glycol 0.3%, Zerewitinoff hydroxyl hydrogen 0.04%.

Analysis show this to be the di-ether of ethylene glycol in which the two carbons of the glycol are attached to alpha carbon atoms of two diglyceride esters by ether oxygen linkages.

The oil product thus obtained is much more compatible with resins than untreated Z linseed oil. The glycol treatment does not interfere with drying or resistance characteristics.

Z linseed oil will not form a clear mix with C37A resin.

The oil produced in this example produces a perfectly clear mixture which remains clear and compatible when flowed on glass.

Example 9

Resin D71

| | Parts |
|---|---|
| Maleic anhydride | 100 |
| Glycerine | 140 |
| WW gum rosin | 850 |

Reflux maleic anhydride with glycerine at 420° F. for ½ hr.; add to the gum rosin at 350–375° F.; reach 525° F., hold 5 hrs. This is a standard type maleic resin.

Varnish

Based on Z linseed oil; based on oil prepared in Example No. 8.

Procedure:

| | Parts |
|---|---|
| Resin D71 | 100 |
| Oil | 200 |
| Mineral thinner | 300 |

Cobalt naphthenate drier: 0.05% cobalt on weight of oil.

Oil and resin heated to 570° F., held 590° F. 10 min., cooled to 450° F., thinned and drier added.

Z linseed oil dissolved the resin only after 1 minute at 590° F. The oil prepared in Example No. 8 dissolved the resin clear at 450° F.

The varnish prepared from Z linseed oil had a viscosity of G and would not blend with alkyd resin C37 (Example 6) in equal parts by weight.

The varnish prepared from the oil produced in Example No. 8 had a viscosity of F and blended clear in all proportions with alkyd resin C37 (Example No. 6).

The water resistance of the dried films was identical.

Both varnishes were made into gloss white enamels by grinding with titanium dioxide pigment in the ratio of three pounds of pigment per gallon of vehicle. Both enamels had identical drying characteristics. The enamel based on the oil produced in Example No. 8 had considerably better brushing characteristics. After 10 months' exposure the enamel based on the oil produced in Experiment No. 8 was much better for gloss retention than the enamel based on Z linseed oil.

Example 10

Resin D71B

Resin PhA (Example No. 5) is heated to 530° F. with 85 gr. of glycerine and held at this temperature 6½ hrs. A high melting high viscosity modified phenolic resin is thus produced.

A. N. 12–14, viscosity 50%, solution in toluol D–E, M. P. 150–155° C. Zerewitinoff hydroxyl hydrogen (corrected) 0.06%.

When used in varnish formula of Example No. 9 it will be found to dissolve in the oil produced in Example No. 8 at 500° F. or less, while ordinary Z linseed oil will not dissolve the resin at lower than 590° F.

The use of the oil produced in Example No. 8 greatly improves the stability of this type of varnish. This stability can be shown on aerating the respective varnishes. The varnishes are placed in glass utensils and air passed through. The rate of flow is adjusted to be identical for both varnishes. It is found that the varnish based on the Z linseed oil will seed and jell in 2–4 hours depending on the rate of flow while the varnish based on the oil produced in Example 8 will not jell on greatly prolonged treatment with air.

Example 11

Resin E94

| | Parts |
|---|---|
| Resin D71B (Example No. 10) | 500 |
| Ethylene glycol | 15 |

The above ingredients are heated at 470° F. for 6 hours. A. N. 7.3, viscosity 50%, solution in toluol B–C, M. P. 150° C. (Hg). Zerewitinoff hydroxyl hydrogen corrected 0.03%.

Resin D71 can be substituted for resin D71B with substantially same results. In which case a resin with alcohol titration of 25 or more is produced.

The two resins are then compared in the following varnish preparation:

Varnish

| | Parts |
|---|---|
| Resin | 100 |
| Body Z linseed oil | 200 |
| Mineral thinner | 300 |

Cobalt naphthenate: 0.05% cobalt on weight of oil.

Oil and resin heated to 590° F., held 590° F. 10 minutes, cooled to 450° F., thinned and added cobalt naphthenate.

Using this procedure Resin D71B will dissolve only after 590° F. is reached, while Resin E94 will dissolve easily to a clear solution at 500° F. or less. The resin E94 Varnish will be found stable when tested as above while the D71B Resin Varnish will not.

Similar varnish characteristics are produced when Resin D71 is substituted for D71B in this example.

My improved products are useful as ingredients of coating compositions for wood, metal, etc. For this purpose they may be used either alone or combined by mutual solvents, by heating, or by other means, with one or more of the following: cellulose derivatives such as ethyl cellulose, nitrocellulose, cellulose acetate, benzyl cellulose, celulose acetopropionate, natural gums such as kauri, rosin, and damar; combined natural gums such as ester gum, methyl and ethyl abietate; drying oils such as linseed, and tung oil; other synthetic resins, such as phenol formaldehyde, amine aldehyde, vinyl and asphalts or bitumens. To my products, either alone or combined with the above substances, pigments, fillers, lakes, plasticizers, antioxidants, solvents, etc., may be added as needed and desired. Any known methods of applying the finish such as spraying, brushing, baking, air drying, etc., may be used.

From the foregoing it will be apparent that I have developed a new method for treating oils and resins which offers many advantages. As compared to known methods of working it allows the production of materials of a much wider range of blendability, and therefore utility. The resistance is not undesirably affected and in many cases the drying is improved. It is also possible to produce stable varnishes with ease and to increase the viscosity of certain types of resins and at the same time improve compatibility and blendability.

As many apparently different embodiments of this invention may be made without departing from the spirit and scope thereof, it is to be understood that I do not limit myself to the specific embodiments thereof except as defined in the following claims.

I claim:

1. A new composition of matter, a terpenic resinous acid ester of pentaerythritol-glycerine ether-alcohol.

2. A new composition of matter, the rosin ester of pentaerythritol-glycerine ether-alcohol.

3. The process for the production of a synthetic resin which comprises heating 1000 parts of rosin with 135 parts of glycerine to 550° F. until a product is obtained which is clear in toluol, and thereafter heating 120 parts of said product with 5 parts of pentaerythritol for five minutes at 570° F., adding 20 parts of rosin and continuing to heat at 540° F. until an acid value of 9 is reached.

HOWARD C. WOODRUFF.